United States Patent Office 3,186,959
Patented June 1, 1965

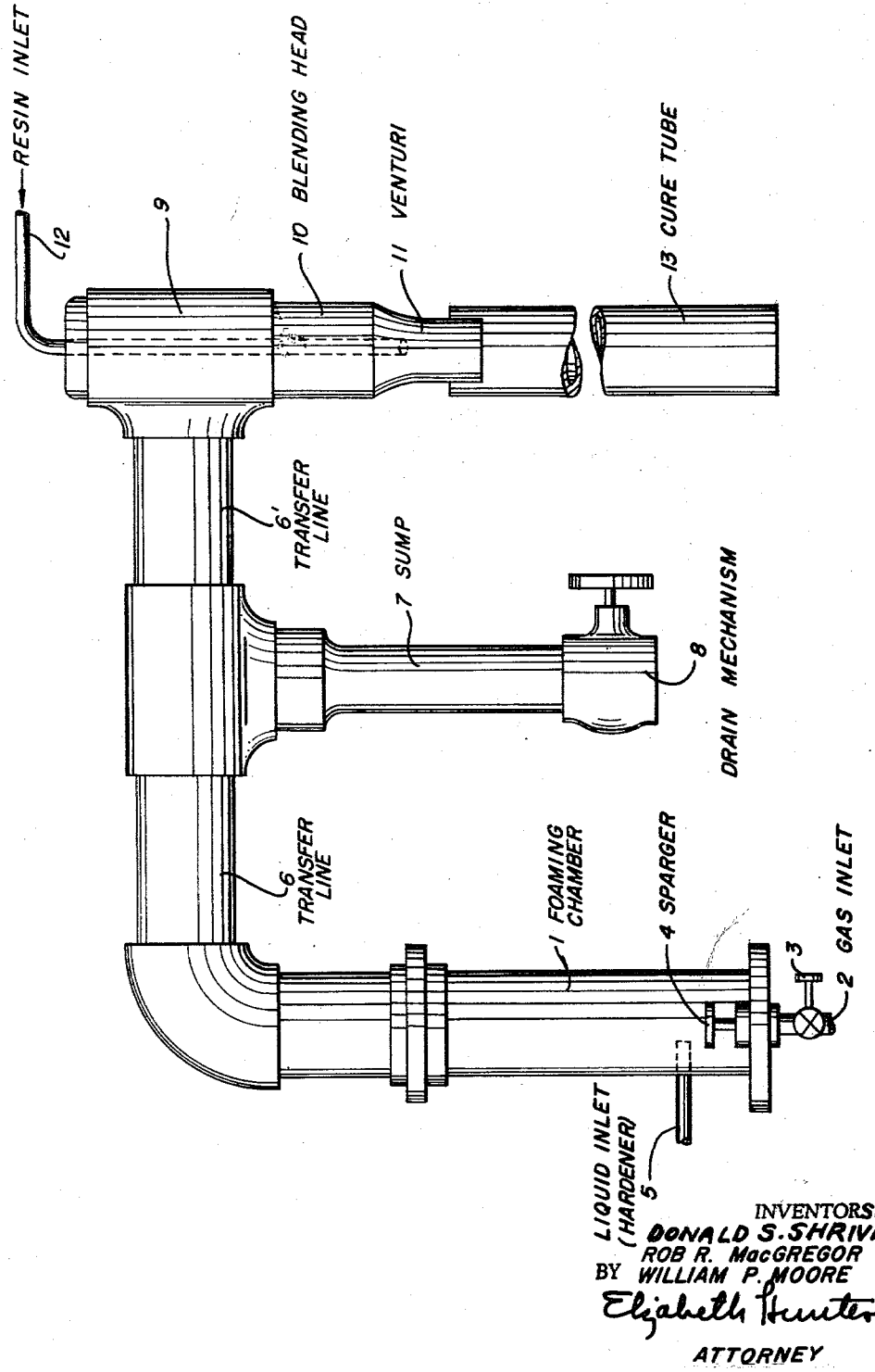

3,186,959
METHOD FOR PRODUCING UREA-FORMALDEHYDE FOAMS
Donald S. Shriver, Prince George County, Rob R. Macgregor, Hopewell, and William P. Moore, Chester, Va., assignors to Allied Chemical Corporation, New York, N.Y., a corporation of New York
Filed Dec. 4, 1961, Ser. No. 156,830
2 Claims. (Cl. 260—2.5)

This invention relates to an improved method for continuously producing urea-formaldehyde foams, and more particularly for continuously producing low density foams with closed cell structures. Such foams are particularly useful for insulation purposes.

Production of urea-formaldehyde foams has been carried out in the past, according to one procedure, by injecting uncured resin into a stirred reaction vessel containing acidic liquid foam prepared by whipping air into water, foaming agent and acid, and curing the resin while it is distributed throughout the stirred foam.

Another procedure has been to dissolve gas or low boiling water-insoluble liquids under pressure into an uncured aqueous urea-formaldehyde resin and to cure the resin while releasing the pressure abruptly, thus producing foam.

The prior art processes have been primarily batch processes or semi-continuous processes which required turbulent mixing and which consequently resulted in non-uniform curing and frequent plugging of the apparatus with prematurely hardened product.

An object of the invention is to provide a process for continuously producing closed cell urea-formaldehyde foams in partially cured, liquid form which are sufficiently cured so as to be self-supporting, but which remain sufficiently fluid to be blown directly into molds or other forming devices.

A further object of the invention is to provide a process for continuously producing a stream of partially cured urea-formaldehyde foam wherein mechanical agitation is avoided.

A still further object of the invention is to provide a process for blending an aqueous urea-formaldehyde resin solution with a foamed hardening solution wherein back blending is avoided.

These and other objects are accomplished by the apparatus illustrated and described herein and by the process of the invention, wherein an aqueous urea-formaldehyde solution is injected cocurrently into a stream of an aqueous acidic foam containing a surfactant and flowing at a space velocity between about 15,000 and about 25,000 hr.$^{-1}$, maintaining the resulting resin-foam mixture under conditions of tubular flow at space velocities between about 1,500 and about 2,500 hr.$^{-1}$, for a time sufficient to effect partial hardening of the foam to the extent that the foam is self-supporting but remains sufficiently fluid to readily fill a molding cavity. Final curing may be accomplished at temperatures, for example, between about 20° C. and about 100° C. in a molding cavity.

In the drawing, the single figure illustrates, somewhat schematically, the apparatus of our invention. As illustrated, numeral 1 represents a vertical liquid-tight foaming chamber, equipped at the bottom with an air inlet 2, controlled by valve 3, and leading to air distributer or sparger 4, the latter positioned within foaming chamber 1. Leading into the foaming chamber is liquid inlet 5, conveniently terminating above sparger 4. Connected to foaming chamber 1 is foam transfer line 6–6', which may optionally have attached thereto intermediate its extremities, a sump 7 and drain mechanism 8 for withdrawing any liquid that may be carried into the transfer tube from the foaming chamber. Transfer line 6–6' empties through end chamber 9 into blending head 10 which, as shown, terminates in a venturi-like restricted portion or reducing head 11 having a throat diameter between about one-third and about one-half the diameter of blending head 10. Pipe 12 leads from a source of resin solution, not shown, through blending head 10, and terminates at the throat of venturi 11. The venturi empties into cure tube 13 which has a diameter not greater than the diameter of the blending head, but may be greater than that of the venturi throat. The cure tube has a length of at least about 50, preferably between about 50 and about 250 times its diameter. The venturi or reducing head may be omitted provided the blending head has a diameter equal to or less than that of the cure tube. The cure tube may be of rigid or flexible construction, and is adapted for discharging its contents into containers, molds or spaces to be insulated, not shown, either without terminal ports, or through any desired shaped end member such as a spreader, fish tail or other desired member. The various members of the apparatus may have any suitable internal configuration or cross section and conveniently may be substantially circular in cross-section. In any event, the internal walls of the apparatus should be substantially free of baffles or obstructions which would tend to promote turbulence in the flow of the foam or back mixing of foam and resin solution.

In operation, the liquid to be foamed is fed to foaming chamber 1 through liquid inlet 5 to the desired liquid level. A controlled flow of air or other inert gas is then passed through gas inlet 2 and sparger 4 into the reservoir of liquid to be foamed, regulated to produce the desired amount of foam. The flow of liquid to be foamed is then coordinated with the gas flow to maintain the desired liquid level in foaming chamber 1 and to produce the desired space velocity through the apparatus. An important feature in the maintenance of a controlled constant liquid level is that liquid is prevented from carrying over into the transfer line with the forward moving foam. As both liquid and gas are fed continuously into the chamber, foam emerges from the top of foaming chamber 1 and is propelled by the slight forward pressure from the gas inlet (ca. 5–20 lbs./sq. in.) through transfer line 6–6', where any excess liquid is trapped in sump 7, and proceeds to blending head 10. Aqueous resin solution, preferably partially cured, as described hereinafter, entering through inlet 12, empties into the foam at the point where the foam enters the reducing head or venturi 11, where it acts as an aspirator, and draws the foam into the resin stream causing thorough mixing and diffusion of foam and resin solutions without breaking the foam, as the mixture progresses into the curing tube 13. The blended resinous foam enters curing tube 13 with more than 99% of the air included in the minute cells of the foam. The length of the cure tube and the space velocity therethrough are regulated so as to provide a curing time long enough so that the foam will not collapse upon emergence, but will remain sufficiently fluid to readily fill a molding cavity.

In carrying out the process according to our invention, any conventional urea-formaldehyde solutions and conventional acidic foams may be used. We prefer, however, to utilize urea formaldehyde solutions in which the formaldehyde component and part of the urea are supplied in the form of a stabilized solution of urea-formaldehyde reaction products prepared according to the teachings of U.S.P. 2,652,377 issued September 15, 1953, and commercially available under the trade name "U.F. Concentrate-85." "U.F. Concentrate-85" is a clear, colorless, viscous, stabilized solution of formaldehyde and urea reaction products in a small amount of water. It contains about 15% water and approximately 85% solids, the latter combined in a formaldehyde to urea mol ratio of about 4.6 to 1, and the product typically contains about 59% formaldehyde and about 26% urea. It does not have a definite boiling point or freezing point. It starts to boil at about 100° C. and becomes extremely viscous and glasslike between —20 and —30° C. It is believed to be a mixture of polymethylol ureas in solution. The mixture is non-resinous and all the formaldehyde is available for resin-forming reactions.

*Foam generation.*—In the process of our invention, foam is generated by continuously blowing air into the foaming chamber filled with aqueous acidic foaming agent (hardener) solution. The air is passed through an aperture in the bottom of the foaming chamber, and the hardener solution is continuously fed into the lower portion of the foaming chamber. The air aperture may be a section of pipe drilled to give small openings, or it may be a porous metal or ceramic sparger which generates foam bubbles 0.1 to 0.6 mm. in diameter. The foam froths to the top of the foam generator at a velocity which should not exceed 2.5 ft./sec. to minimize liquid hardener being carried forward with the foam. The line connecting the foam generator with the blending head may be fitted with a sump, if desired, to trap liquid hardener passing with the foam from the foaming chamber, to prevent unfoamed hardener solution reaching the blending head which tends to cause plugging of the apparatus.

The hardener solution is an aqueous solution containing about 2% of a surfactant as foaming agent such as soap, alkyl aryl sulfonates or other conventional foaming agent and about 0.5% of a weakly ionized acid such as formic acid. The use of a weakly ionized acid (dissociation constant ca. $1.6 \times 10^{-4}$) is important to minimize premature hardening of the resin in the apparatus.

*Blending foam and resin.*—When the foamed hardener reaches the blending head, urea-formaldehyde resin solution is added to the foam. The weight ratio of hardener solution to resin solution is between 0.5 and 2.3. Blending takes place as the foam and resin are moved together through the blending head at a space velocity in excess of 15,000 hr.$^{-1}$ (based on total volume of the blending tube). The lower extremity of the blending tube consists of a venturi with a throat diameter of one-third to one-half of the diameter of the blending tube. The venturi increases the speed of blending without creating eddy streams or back-mixing. No mechanical agitation is used to accomplish blending. This is important because mechanical agitators would break the "windows" in a large portion of the foam cells, producing an open-cell foam. Agitators would also cause considerable back-mixing in the blender which would contribute to a rapid buildup of polymer on the moving parts of the apparatus, causing plugs and equipment shutdown.

*Resin.*—The urea-formaldehyde resin solution used in this process should have a solids content of about 50–65%, a formaldehyde to urea mol ratio between 1.5 and 2.0 and a viscosity of approximately 40–55 centipoise at 25° C. The linear velocity of the liquid resin sent to the blender should be at least 0.3 ft./sec. to prevent plugging of the apparatus. Suitable resin and hardener solutions for use in the process may be prepared as illustrated in the examples herein.

*Foam cure.*—As the foamed urea-formaldehyde resin emerges from the blending head, it is at a low state of cure and would not support itself if it were sent immediately to a mold. Therefore, this partially cured foam is sent directly to a curing tube where sufficient retention time is provided for the cure to reach the stage where the foam will support itself. For accomplishing this result the flow of the foam should be forward at a space velocity of about 1500–2500 hr.$^{-1}$. Flow in the curing tube must be such that there is little or no back-mixing. This type flow is tubular flow. Tubular flow occurs where the cure tube length is large with respect to reactor diameter, and the forced velocity in the direction of flow is sufficient to retard mixing in the axial direction. Any significant back mixing in the cure tube must be avoided because it results in very rapid polymer buildup on the cure tube walls, that is, the portion of the resin which takes the longest path through the cure tube will cure to a stiff, sticky condition in the tube. The linear velocity of the fluid required to give tubular flow in a given reactor depends on various physical properties of the fluid, particularly the viscosity. We have found that tubular flow may be obtained with the urea-formaldehyde foam and a long trouble-free operating period obtained with linear velocities of 2 ft./sec. or higher in a 1-inch diameter cure tube. In a 2-inch diameter cure tube equal results are obtained with linear velocities of 6 ft./sec. or more. Thus, two prime control requirements must be satisfied in the cure tube: tubular flow must be achieved and the cure time must be held in the range where the product is cured far enough to support itself but not enough to set up or stick in the cure tube. Preferably, the diameter of the curing tube is 40–200 times the diameter of the bubbles in the tube and the space velocity is about 1,500 hr.$^{-1}$ to 2,500 hr.$^{-1}$.

The air or other inert gas sent to the sparger should be at such a rate that essentially all the air (>99%) is occluded in foam bubbles. This is readily accomplished by adjusting the volume of air furnished to equal the volume of foam produced. On a volume basis, the ratio of air to liquids added in the process is preferably in the range of 5 to 55. Excess air should be avoided. If excess air is employed, the "windows" are blown out of the cell walls as the foam passes through the cure tube in an incomplete state of cure. The cell walls are also broken if violent agitation or shear occurs. With the tubular flow cure tube and a controlled velocity in the tube the foam emerges cured to the extent that it will support itself and may be suitably molded while the cure is completed. If desired, acid gases (such as HCl or $SO_2$) or acid solution may be added to the foam as it emerges from the cure tube to facilitate the hardening of the foam; ordinarily extra acid is not used. The cure tube may be constructed of either flexible or rigid material, as desired.

A summary of preferred conditions of operation is given in the following tabulation:

| Condition | Range |
|---|---|
| Foam generation: | |
| Foam former | Air eductor, bubbler, sparger type bubble former. |
| Bubble size | 0.1–0.6 mm. diameter. |
| Bubble flow | Foam froths from top of foam generator. |
| Velocity of foam in generator | 0.5–2.5 ft./sec. |
| Foam transfer to blender | Through a line fitted with a sump to remove unfoamed hardener. |
| Foam blending: | |
| Foam blender | Venturi type, no moving parts. |
| Ratio air/total liquids, vol./vol. | 5–55. |
| Foam space velocity in blender, hr. $^{-1}$. | 15,000–25,000. |
| Type flow in blender | Tubular flow. |
| Ratio hardener solution/resin soln., wt./wt. | 1–2. |
| Foam cure: | |
| Type apparatus | Cure tube. |
| Type flow in cure tube | Tubular flow. |
| Portion of air occluded in foam bubbles. | 99+%. |
| Space velocity of foam in cure tube, hr.$^{-1}$. | 1,500–2,500. |
| Construction of cure tube | Rigid or flexible. |
| Ratio tube diameter/bubble dia. | 40–200. |

The effectiveness of the urea-formaldehyde foam generating process and apparatus of the present invention are further illustrated by the following example:

*Example*

(A) Hardener solution was continuously fed through the hardener inlet 5 to the foaming chamber 1 at a rate of 1800 grams (1760 cc.) per minute with the following composition:

| Component: | Wt. Percent |
|---|---|
| Water | 97.55 |
| Formic acid | 0.50 |
| Nacconal SZA (a commercially available foaming agent, a viscous liquid compound 80% alkyl aryl sulfonic acid and having a pH of 1.5 | 1.95 |

Air was simultaneously sent to the foaming chamber 1 through air inlet 5 at a rate of 2 ft.³/min. and injected by air sparger 4 to give foam containing bubbles primarily about 0.2–0.6 mm. in diameter. The foaming chamber consisted of a section of 1½ in., Schedule 40 stainless steel pipe 13 in. long (10½ in. above the hardener solution inlet). The foaming chamber contained an air sparger made of a porous stainless steel disk (Pall Corp.) 1⅝ in. in diameter with a mean opening size of 15 microns. The foam was frothed from the top of the foaming chamber at a space velocity of 3640 hr.$^{-1}$ and sent through transfer line 6 through hardener sump 7 where any liquid hardener solution was removed through drain 8 and discarded. This discarded hardener solution amounted to 8 percent of the total hardener charged. The foam, drained of liquid hardener passed through transfer line 6' to the blending head 10.

(B) Resin for use in the foaming apparatus was prepared and partially cured by the following procedure: To a 50-liter conical tank was added 18,000 grams water and 7,000 grams urea. The contents were agitated and heated to 90° C. and 20 kilograms of "U.F. Concentrate-85" (equivalent to 59% wt. HCHO—26% urea—15% water) was added slowly over a 20-minute period. After the addition of "U.F.-85," 10 ml. of conc. (89%) formic acid was added, bringing the solution pH to 5. The reaction temperature was maintained at 93° C. After 29 minutes, the viscosity had increased to 21 centipoise (taken at 41° C.). The resin formation reaction was stopped after 34 minutes by adding 14.1 ml. of 50% (wt.) aqueous sodium hydroxide solution and by cooling the contents quickly to 25° C. The viscosity was then 43.5 centipoise at 25° C. and resin pH was 7.1. To 45.37 pounds of the partially cured resin was added 1375 grams of urea and 367 grams ammonium bicarbonate. Viscosity of the final resin was 45 centipoise at 25° C.

(C) The partially cured resin, described above, was continuously fed through resin inlet 12 at the rate of 900 gm. per minute (750 cc./min.) to the blending head 10; the hardener to resin weight ratio was 2. The blending head consisted of a 4½ in. section of 1½ in., Schedule 40 pipe (1.61 in. I.D.) with a venturi on the lower extremity of the tube having a throat diameter of 0.74 in. The partially cured resin entered the blending head 1½ in. from the lower end. The resin and foamed acid commingled as they passed through the blending head at a space velocity of 21,000 hr.$^{-1}$, including the air and based on the total volume of the blending head. The air/total liquids volume ratio was 22.6, with 99+% of the air contained in the small bubbles of the foam. Polymerization of the partially cured resin was reactivated when the hardener foam met the resin and further curing was begun.

(D) The curing foam emerged from the blending head 10 into the cure tube 13 at a rate of about 2 ft.³/min. and passed through at a space velocity of 2200 hr.$^{-1}$. The cure tube was 1 in. I.D. and 10 ft. long. The linear velocity in the cure tube was 6.11 ft./sec., well over the minimum required to give Tubular Flow in a 1 in. I.D. tube. The foam left the cure tube in a continuous stream and was used to fill numerous large molds.

(E) The molded foam was dried and inspected with a stereoscopic microscope. The cell structure of the foam was completely closed with the cell walls (windows) intact. The cell size varied primarily between 0.33 and 0.58 mm. diameter. The density of the dried foam was 0.5 lb./ft.³.

While the above describes the preferred embodiments of our invention, it will be understood that departures may be made therefrom within the scope of the specification and claims.

We claim:
1. A process for continuously producing partially hardened closed cell structure urea-formaldehyde foams which comprises injecting a stream of aqueous urea-formaldehyde resin solution cocurrent into a stream of an aqueous acidic foam containing a surfactant and flowing under conditions of tubular flow at a space velocity between about 15,000 and about 25,000 hour$^{-1}$; maintaining the resulting resinous foam mixture under conditions of tubular flow at space velocities between about 1,500 and about 2,500 hour$^{-1}$ for a time sufficient to effect partial hardening of the foam to the extent that the foam is self-supporting but remains sufficiently fluid to readily fill a molding cavity.

2. A process for continuously producing partially hardened, closed cell structure urea-formaldehyde resin foams, which comprises forming, from an aqueous acidic solution containing a surfactant as foaming agent, a stable foam having bubbles whose diameters are in the range between about 0.1 m. and about 0.6 mm., propelling said foam through a blending head at a space velocity between about 15,000 hour$^{-1}$ and about 25,000 hour$^{-1}$, injecting cocurrent into said foam a stream of aqueous urea-formaldehyde resin solution in a weight ratio of foam to resin solution of between about 0.5 and about 2.3 in a zone of restricted flow whereby thorough blending of foam and resin takes place, propelling the thus blended resinous foam under conditions of tubular flow through a curing zone at a space velocity between about 1,500 hour$^{-1}$ and about 2,500 hour$^{-1}$ and a linear speed of at least about 0.3 feet per second for a period sufficient to produce a self-supporting resinous foam.

References Cited by the Examiner
UNITED STATES PATENTS

| 2,813,780 | 11/57 | Vieli | 260—2.5 |
| 2,970,120 | 1/61 | Kreidl et al. | 260—2.5 |
| 3,006,871 | 10/61 | Sunderland | 260—2.5 |
| 3,026,183 | 3/62 | Cole | 23—252 |
| 3,035,902 | 5/62 | Kurz | 23—252 |
| 3,063,952 | 11/62 | Vieli | 260—2.5 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,186,959                          June 1, 1965

Donald S. Shriver et al.

It is hereby certified that error appears in the above numbered patent requiring correction and that the said Letters Patent should read as corrected below.

Column 4, in the table, first column, line 11 thereof, for "hr.1$^{-1}$" read -- hr.$^{-1}$ --; column 6, line 36, for "0.1 m." read -- 0.1 mm. --.

Signed and sealed this 2nd day of November 1965.

(SEAL)
Attest:

ERNEST W. SWIDER                                                 EDWARD J. BRENNER
Attesting Officer                                                          Commissioner of Patents